(12) United States Patent
Zinser et al.

(10) Patent No.: US 7,304,397 B2
(45) Date of Patent: Dec. 4, 2007

(54) FUEL CELL SYSTEM

(75) Inventors: Wolfgang Zinser, Kirchheim/Teck (DE); Markus Aberle, Dettingen (DE)

(73) Assignee: NuCellSys GmbH, Kirchheim/Teck-Nabern (DE)

( * ) Notice: Subject to any disclaimer, the term of this patent is extended or adjusted under 35 U.S.C. 154(b) by 527 days.

(21) Appl. No.: 10/620,844

(22) Filed: Jul. 14, 2003

(65) Prior Publication Data
US 2004/0096711 A1    May 20, 2004

(30) Foreign Application Priority Data
Jul. 13, 2002 (DE) .................. 102 31 699

(51) Int. Cl.
*H02K 16/00* (2006.01)
*H02K 1/00* (2006.01)
*H02K 3/00* (2006.01)
*F02B 63/04* (2006.01)

(52) U.S. Cl. ............... 290/1 R; 310/114; 310/184
(58) Field of Classification Search ............ 429/9, 429/23; 290/1 R; 310/112, 114, 156.25, 310/180, 184, 198
See application file for complete search history.

(56) References Cited

U.S. PATENT DOCUMENTS

| | | | | |
|---|---|---|---|---|
| 1,955,111 A * | 4/1934 | Buckler ................ | 322/30 |
| 3,538,405 A * | 11/1970 | Borden et al. ......... | 318/67 |
| 4,390,821 A * | 6/1983 | Krampe et al. ........ | 318/85 |
| 4,609,862 A * | 9/1986 | Becker et al. ......... | 322/90 |
| 4,785,213 A * | 11/1988 | Satake ................. | 310/116 |
| 5,304,883 A * | 4/1994 | Denk .................. | 310/180 |
| 5,482,790 A * | 1/1996 | Yamada et al. ........ | 429/9 |
| 5,528,094 A * | 6/1996 | Hasebe et al. ........ | 310/112 |
| 5,838,085 A * | 11/1998 | Roesel et al. ......... | 310/113 |
| 5,844,342 A * | 12/1998 | Miyatani et al. ...... | 310/114 |
| 5,998,901 A * | 12/1999 | Kawabata et al. ..... | 310/114 |
| 6,034,456 A * | 3/2000 | Osama et al. ......... | 310/90.5 |
| 6,534,208 B1* | 3/2003 | Zinser ................. | 429/9 |
| 6,683,396 B2* | 1/2004 | Ishida et al. .......... | 310/50 |
| 6,737,778 B2* | 5/2004 | Daikoku et al. ....... | 310/112 |
| 2002/0064695 A1 | 5/2002 | Raiser ................. | 429/13 |
| 2003/0180583 A1* | 9/2003 | Ichikawa et al. ...... | 429/9 |

FOREIGN PATENT DOCUMENTS

| | | |
|---|---|---|
| DE | 43 18 818 A1 | 12/1994 |
| DE | 44 12 451 C1 | 9/1995 |
| DE | 198 16 918 A1 | 10/1999 |
| DE | 199 51 584 A1 | 5/2001 |
| EP | 0 633 158 A1 | 1/1995 |
| EP | 0 950 559 A2 | 10/1999 |
| JP | 2001189163 A * | 7/2006 |

* cited by examiner

*Primary Examiner*—Julio C. Gonzalez
(74) *Attorney, Agent, or Firm*—Crowell & Moring LLP

(57) ABSTRACT

A fuel cell based system for the generation of electrical energy employs a drive unit that includes at least two electric motors sharing a common rotor which is mechanically coupled to drive a compressor to provide oxidant and/or fuel to a fuel cell. An electrical storage device such as a battery produces a voltage in at least a low voltage one of the electric motors to startup the system, and the fuel cell supplies a voltage to a high voltage one of the electric motors to drive the compressor, one or more loads such as a traction motor, and/or recharge the electrical storage device during standard operation.

7 Claims, 1 Drawing Sheet

FUEL CELL SYSTEM

BACKGROUND OF THE INVENTION

1. Field of the Invention

This disclosure is generally related to fuel cell systems for generating electrical energy, and more particularly to the startup of fuel cell systems.

2. Description of the Related Art

A fuel cell system of this class is known from DE 199 51 584 A1. The use of the two synchronous machines such as two permanent-magnet electric motors, as specified in DE 199 51 584 A1, eliminates the previous need for DC/DC converters, so that the overall fuel cell system becomes less complicated and thus better suited for practical application.

A drawback of this approach is that the synchronous machines require collector rings for field excitation, which are subject to high wear and tear, and thus present a problem to the practical commercial embodiments of the proposed system. A further disadvantage of this approach is the requirement of an additional controller, which results in higher costs and makes the resulting system unnecessarily complicated.

Many applications for fuel cell based power generation systems are extremely price sensitive. Further, high reliability must be demonstrated to establish the fuel cell based power generation system market. Thus, a fuel cell based system for the generation of electrical energy that possesses a simple design and at the same time ensures reliable starting and problem-free operation of the fuel cell is desirable.

BRIEF SUMMARY OF THE INVENTION

In one aspect, the use of at least two permanent-magnet electric motors eliminates the need for the collector rings that are otherwise necessary, which significantly increases the suitability of the fuel cell system for practical application. Furthermore, permanent-magnet electric motors are able to achieve significantly higher output, which further increases the suitability of the invention's fuel cell system for practical application.

In an advantageous further aspect, the two electric motors are equipped with their own respective voltage converter, which makes it possible to directly drive the compressor that supplies the fuel cell. This eliminates the need for control equipment that would otherwise be necessary and reduces the complexity of the resulting fuel cell system.

In a further advantageous aspect, a particularly space-saving realization of a drive unit is realized by a concentric arrangement of the two stator windings.

Further advantageous aspects, embodiments and further developments will become apparent from the description and figures that follow.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with fuel cells, controllers, compressors, fans, electric motors and/or transmissions have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the claimed invention.

Figure 1:
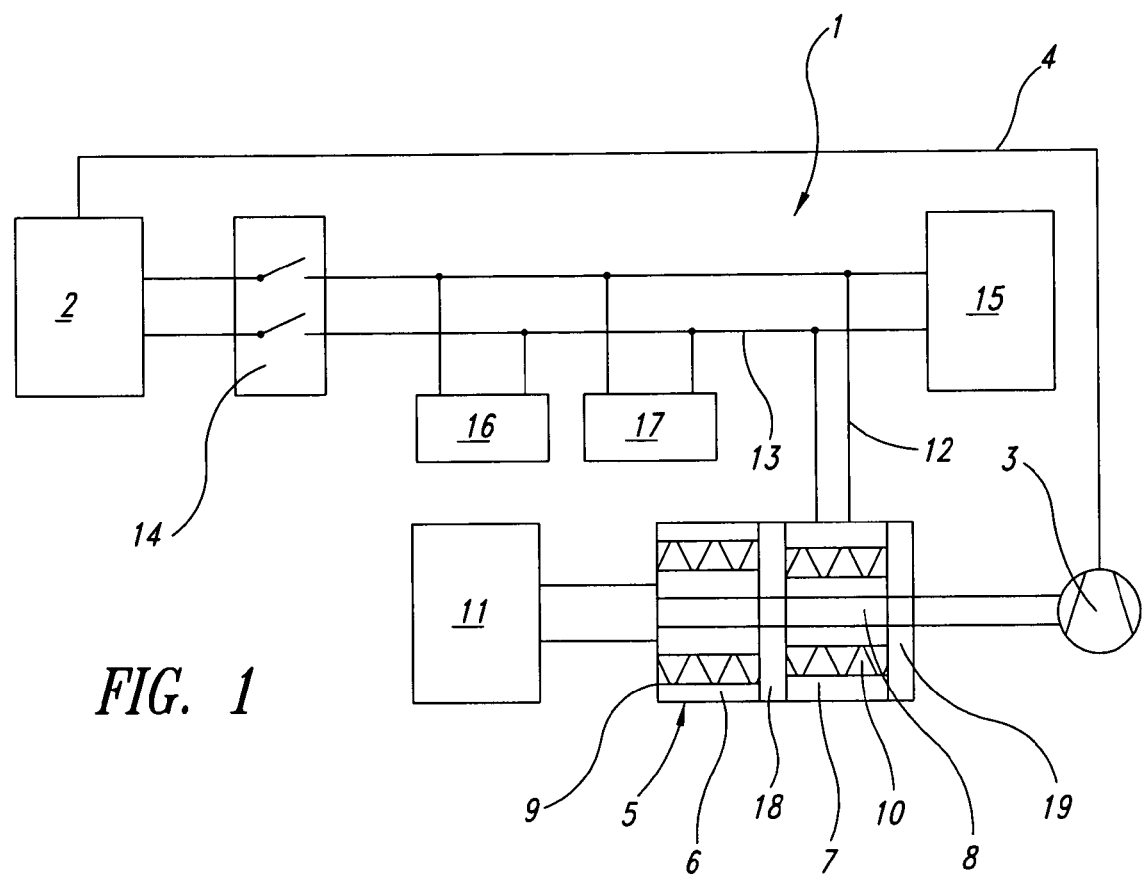
FIG. 1 shows a schematic diagram of a circuit layout of a fuel cell based power generation system according to one illustrated embodiment, comprising a fuel cell stack, compressor, drive unit including two electrical motors sharing a common rotor, an electrical storage device, and various other components.

FIG. 1 shows a schematic illustration of a fuel cell system 1 with a fuel cell stack comprising at least one fuel cell 2, which may be of a design known in the art and operates in a manner known in the art. The fuel cell system 1 may for example be housed in a vehicle and may serve for the propulsion of said vehicle. A compressor 3, which is connected to the fuel cell 2 via a line 4, serves to supply an oxidant, preferably air, to the fuel cell 2. The method of operation of the compressor 3 is also known in the art and for this reason will not be explained in more detail in the following.

For driving purposes, the compressor 3 is rigidly connected to a drive unit 5, which comprises two electric motors 6, 7. The two electric motors 6, 7 possess a common rotor 8, which is intended to directly drive the compressor 3 and for this reason is mechanically rigidly connected to the compressor 3. In the present case, this is achieved by the compressor 3 being flanged directly onto a power-output shaft formed by the rotor 8. It is of course also possible to interconnect the motors 6, 7 and the compressor 3 via other transmissions such as a gear unit or similar device.

The rotor 8 is equipped with permanent magnets, so that the two electric motors 6, 7 are in fact permanent-magnet motors.

The first electric motor 6 is equipped with a low-voltage stator winding 9 and for this reason hereafter will be referred to as low-voltage electric motor 6. The low-voltage stator winding 9 may for example be at a voltage of 42 Volt. In contrast, the electric motor 7 is equipped with a high-voltage stator winding 10, and consequently will be referred to hereafter as high-voltage electric motor 7, with a voltage that may, for example, be in a range of 250-450 Volt.

The low-voltage electric motor 6 or low-voltage stator winding 9 is connected to an electrical storage device such as a battery 11, which produces a voltage in the low-voltage stator winding 9 for the purpose of starting the fuel cell system 1. In this regard, a further battery (not shown) may be provided that supplies a voltage of, for example, 12 Volt to the vehicle's on-board electrical system and is connected to the battery 11 via a DC/DC converter. As an alternative, one could envision an auxiliary winding in the low-voltage electric motor 6.

The current flowing in the low-voltage stator winding 9 due to the generated voltage and the fact that the rotor 8 is equipped with permanent magnets in a known manner lead to a rotation of the rotor 8. This rotation of the rotor 8 causes the compressor 3 to start operating and to supply oxidant to the fuel cell 2, resulting in a start-up of the latter.

Furthermore, the rotation of the rotor 8 brought about by means of the low-voltage stator winding 9 induces a voltage in the high-voltage stator winding 10 of the high-voltage electric motor 7, whereby this voltage reaches a switch 14 via lines 12 and a high-voltage bus 13. As soon as the voltage in the high-voltage bus 13 reaches a certain level, the switch 14 may be closed, for example automatically. When the switch 14 is closed, the fuel cell 2 is electrically connected to both the high-voltage electric motor 7 and a load to be driven such as a traction motor 15. Thus, it is possible for the fuel cell 2 that has been started in this manner to drive a vehicle (not illustrated) or other load in addition to the compressor 3.

In addition to driving the traction motor 15, the fuel cell 2 may during its operation also supply voltage to the battery 11 via the high-voltage bus 13, the line 12, and the drive unit 5, and in this manner charge the battery 11. Furthermore, the drive unit 5 may in this manner also drive other operational loads, such as a water pump 16 and a high-pressure compressor 17, which serve well-known functions in a fuel cell system 1. Alternatively, the water pump 16 and the high-pressure compressor 17 may also be flanged directly onto the shaft of the rotor 8.

The two electric motors 6, 7 are equipped with respective voltage converters 18 and 19. The voltage converter 18 that is associated with the low-voltage electric motor 6 serves to adapt the speed of the low-voltage electric motor 6 to the speed of the compressor 3. On the other hand, the voltage converter 19 adapts the high-voltage electric motor 7 to the conditions of the fuel cell 2. It is also possible for these two functions to be carried out by a single voltage converter of the drive unit 5.

Figure 2:
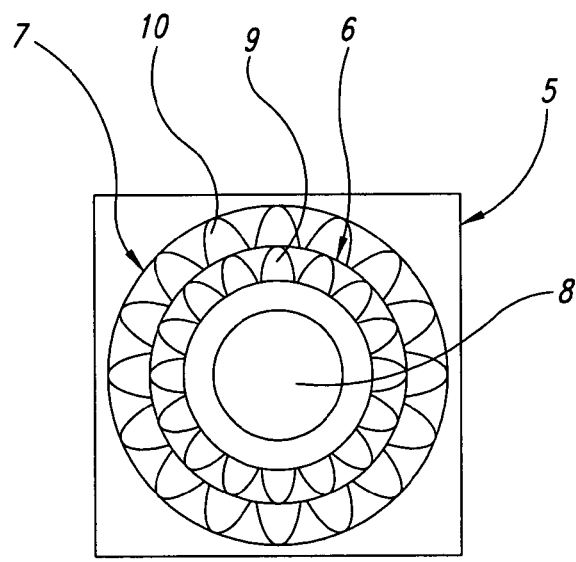
FIG. 2 shows an enlarged diagrammatic illustration of the drive unit of FIG. 1.

FIG. 2 shows a diagrammatic section of the drive unit 5 with the two electric motors 6, 7. It shows that the two stator windings 9 and 10 are arranged concentrically with respect to each other, whereby in the present case the low-voltage stator winding 9 is arranged inside of the high-voltage stator winding 10. The representation of the two stator windings 9 and 10 in FIG. 1 should be considered as greatly simplified and was only chosen for reasons of better presentation. Alternatively, one could envision a reversed arrangement of the two stator windings 9 and 10. Either arrangement results in significant space-savings.

Although specific embodiments of and examples for the fuel cell based generation system and method of operating the same are described herein for illustrative purposes, various equivalent modifications can be made without departing from the spirit and scope of the invention, as will be recognized by those skilled in the relevant art. The teachings provided herein of the invention can be applied to power generation systems employing fuel, reactant or oxidant delivery devices, not necessarily the exemplary fuel cell based generation system generally described above.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to DE 199 51 584 A1 and DE 102 31 699.6 are incorporated herein by reference, in their entirety. Aspects of the invention can be modified, if necessary, to employ systems, circuits and concepts of the various patents, applications and publications to provide yet further embodiments of the invention.

These and other changes can be made to the invention in light of the above-detailed description. In general, in the following claims, the terms used should not be construed to limit the invention to the specific embodiments disclosed in the specification and the claims, but should be construed to include all power generation systems that operate in accordance with the claims. Accordingly, the invention is not limited by the disclosure, but instead its scope is to be determined entirely by the following claims.

The invention claimed is:

1. A system for the generation of electrical energy, comprising:
   a fuel cell stack comprising at least one fuel cell operable to generate electrical energy;
   at least a first compressor coupled and operable to supply an oxidant flow to the fuel cell; and
   a drive unit comprising at least two permanent-magnet electric motors each comprising a respective separate set of stator windings and both electric motors sharing a common rotor, the common rotor mechanically coupled to drive the first compressor;
   wherein the sets of stator windings of the electric motors are arranged concentrically with respect to one another, with one set of stator windings being positioned concentrically inside of the other set of stator windings, and said other set of stator windings being disposed radially outward of and radially adjacent to said one set of stator windings.

2. The system of claim 1, further comprising:
   at least one electrical storage device electrically couplable to supply power to at least one of the electric motors.

3. The system of claim 2 wherein the at least one electrical storage device comprises a battery.

4. The system of claim 1, further comprising:
   a first voltage converter electrically coupled to supply a first voltage to a first one of the electric motors; and
   a second voltage converter electrically coupled to supply a second voltage to a second one of the electric motors.

5. The system of claim 1, wherein one of the sets of stator windings is a high-voltage stator winding and the other one of the sets of stator windings is a low-voltage winding.

6. The system of claim 5, further comprising:
   a first voltage converter electrically coupled to supply a first voltage to a first one of the electric motors; and
   a second voltage converter electrically coupled to supply a second voltage to a second one of the electric motors.

7. A system for the generation of electrical energy, comprising:

a fuel cell stack comprising at least one fuel cell operable to generate electrical energy;

at least a first compressor coupled and operable to supply an oxidant flow to the fuel cell; and a drive unit comprising at least two permanent-magnet electric motors each comprising a respective separate set of stator windings and both electric motors sharing a common rotor, the common rotor mechanically coupled to drive the first compressor; wherein, the sets of stator windings of the electric motors are arranged concentrically with respect to one another;

one of the sets of stator windings is a high-voltage stator winding and the other one of the sets of stator windings is a low-voltage winding; and the low-voltage stator winding is positioned concentrically inside of the high-voltage stator winding.

* * * * *